April 16, 1946.  N. SOFTIS  2,398,727

LIQUID DISPENSING APPARATUS

Filed Jan. 1, 1944

INVENTOR:
NICK SOFTIS

BY Lawrence H. Cohn
ATTORNEY

Patented Apr. 16, 1946

2,398,727

UNITED STATES PATENT OFFICE 2,398,727

LIQUID DISPENSING APPARATUS

Nick Softis, Clayton, Mo.

Application January 1, 1944, Serial No. 516,687

2 Claims. (Cl. 222—324)

My invention relates to improvements in liquid dispensing apparatus, and more particularly to an improved portable dispenser which is especially adapted for use in restaurants, lunch counters and the like for serving measured quantities of cream, as for coffee or cereal, or wherever it is desired to quickly and repeatedly measure out a definite quantity of liquid.

An object of my invention resides in the provision of a dispensing utensil of the character stated, having improved means for controlling the discharge flow of liquid therefrom, and for restricting to a predetermined amount the quantity of liquid issuing from the utensil during each opoperation of the control means.

Another object is to provide a pitcher-like dispensing vessel having a finger actuated valve for controlling the discharge flow, whereby successive discharges of definite quantities may be effected and controlled while the vessel is continuously held in a tilted or pouring position.

A further object is attained in the provision of measuring and dispensing means of the character stated, disposed for the most part in the pouring spout of the vessel, and which is of a character to cause the fluid to issue from the pouring spout in a smooth, even flowing stream, such that it can be easily directed into a small-mouthed receiving vessel.

Other objects are directed to provisions which enable the operating parts of the mechanism to be removed from the vessel to permit all surfaces and parts to be thoroughly cleaned and sterilized.

These and other objects and advantages will appear in the following description wherein reference is made to the accompanying drawing.

Figure 1:
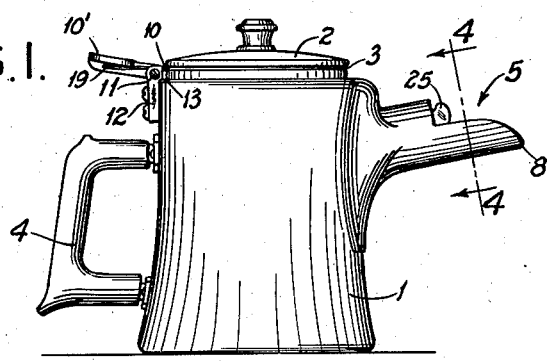
Fig. 1 is a side view of a dispensing device constructed in accordance with my invention.
Figure 2:
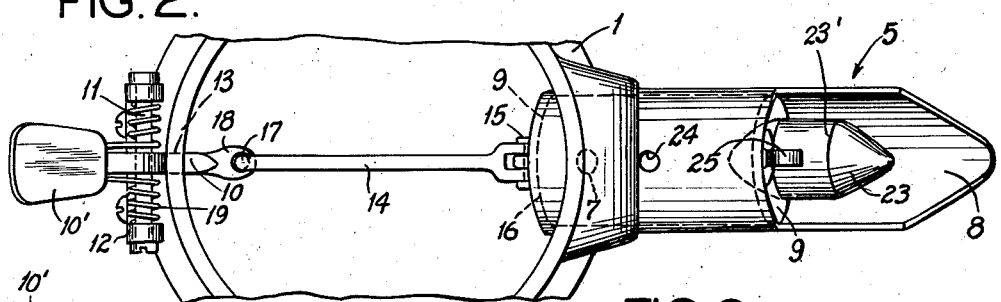
Fig. 2 is a top plan view of the device, drawn to a larger scale and with the cover removed.

Referring now by characters of reference to the drawing, in Fig. 1 there is illustrated a dispensing vessel having a hollow main body portion 1 provided at its upper end with an opening for filling the vessel, which opening is adapted to be closed by means of a removable cover or cap member 2, suitable means such as the sealing gasket 3 being provided for preventing leakage around the cover when the vessel is tilted for pouring; a handle 4 of conventional form is secured to the main body 1 and on the side of the vessel opposite handle 4 is the pouring spout 5.

The pouring spout comprises a tube that extends through the wall of the vessel near its upper end, and the tube preferably slopes upwardly and outwardly to a small degree as shown, the purpose being to allow any fluid which might be trapped in the measuring cylinder when the discharge port is closed, as will hereinafter be described, to flow back into the main compartment of the vessel when the device is restored to an upright position. The lower portion of the tube 5 at its inner end is cut away or recessed as indicated at 6, and a vent opening 7 is formed in the upper side of the inner end portion of the tube, such vent opening forming an air relief passage when the measuring chamber is filling, and serving to expedite the flow of fluid into the measuring chamber when the vessel is tilted forwardly to a pouring position. A trough-like extension 8 of the tube 5 at its forward end makes it easy for the user to direct the flow from the tube into a relatively small-mouthed receptacle such as is commonly used for serving an individual portion of cream for coffee.

The flow of fluid through the tube 5 is measured and controlled by means of a hollow cylindrical valve-like body 9 which is disposed for longitudinal movement in the tube. Movement of the cylinder 9 is effected and controlled by means of a thumb lever 10 which is pivotally mounted on a horizontal pin 11 carried by a bracket 12 which is secured to the side wall of the vessel, immediately above the handle 4.

Figure 3:
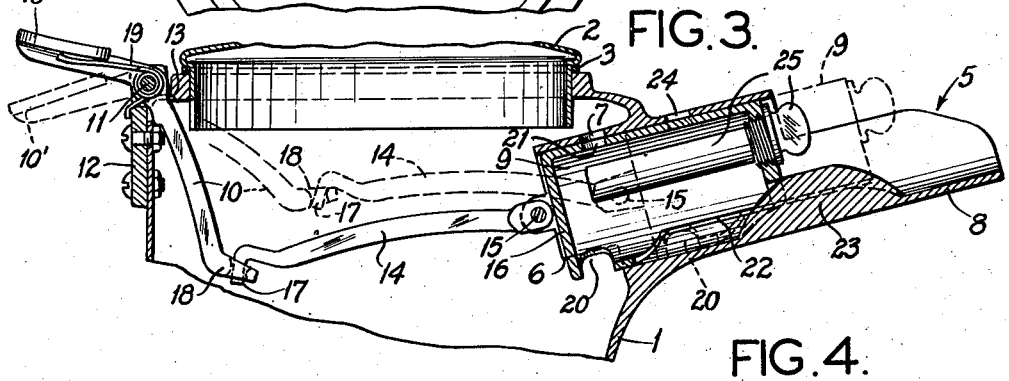
Fig. 3 is a sectional elevational view showing the measuring and control mechanism.
Figure 5:
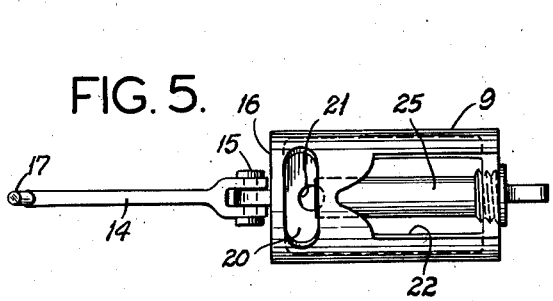
Fig. 5 is a bottom plan view of the measuring cylinder.
Figure 4:
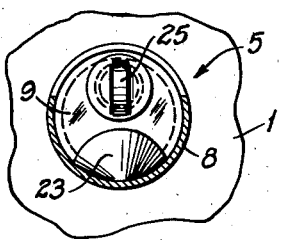
Fig. 4 is a sectional view taken at line 4—4 of Fig. 1.

The inner end of the lever 10 extends downwardly through an opening 13 in a shoulder formed near the top of the vessel, and at its lower end the lever is connected to a link member 14. The opposite or forward end of the link 14 is connected by a pin 15 to the inner end wall 16 of the measuring valve cylinder 9. The coupling between the link member 14 and the lever 10 is preferably such as to permit ready disconnection of these parts so that the cylindrical valve assembly may be completely removed from the vessel to facilitate cleaning. Separation of the members 10 and 14 for this purpose is provided for by a coupling consisting, in the present example, of a depending pin 17 on the end of the link, which pin fits loosely in an opening in an angularly bent foot portion 18 of the lever 10. A spring 19 coiled about the pin 11 has an end thereof bearing upwardly against the thumb portion 10' of the lever 10. Normally, or in the absence of a downward pressure stroke on the thumb piece 10' of the valve lever, the spring 19 holds the thumb piece in an elevated position, and, acting through link 14, holds the measuring cylinder 9 in a retracted position, as shown in Fig. 3.

The lower side wall of the measuring cylinder has a transverse slot-like opening 20 located adjacent the inner end wall, such opening providing a passage for admitting fluid from the main compartment into the cylinder, the vessel, of course, being required to be tilted forwardly to cause the fluid to flow into the cylinder through said passage. A second opening 21 is located in the upper side wall of the valve cylinder so as to register with the opening 7 when the cylinder is retracted, combining with opening 7 to form the air relief passage previously referred to.

The fluid in the measuring cylinder is adapted to be discharged through an opening 22 located in the forward end wall and extending into the lower side wall of the cylinder. To open the discharge passage the cylinder is required to be moved forwardly so that the front part of said opening lies clear of a closure member 23. The member 23 preferably comprises a ridge-like projection that extends longitudinally within and is fixed to the bottom of the channel of the pouring spout. In a presently preferred form the closure member 23 is semi-cylindrical in transverse section and the forward and rear ends thereof are tapered, as shown. This gives the closure member a torpedo-like, or streamline shape which enables the fluid to flow out of the cylinder with practically no turbulence, so that it discharges in a smooth, even flowing stream. The discharge flow from the cylinder is facilitated by the provision of an opening 24 that registers with cylinder aperture 21 when the cylinder is shifted forwardly to its discharge position, the passage thus formed enabling air to enter the chamber to replace the discharging fluid.

It will be understood that the quantity of fluid dispensed with each downward stroke of the thumb lever 10 is measured by the internal capacity of the measuring cylinder. It is sometimes desirable to vary this quantity and for such purpose there is provided several plugs, one of which is designated 25, the plugs being of different length and adapted to be selectively installed within the cylinder through said opening, each plug being of a size to decrease the capacity of the cylinder by a predetermined amount.

In connection with the operation of my improved dispensing vessel it will appear that by suitably tilting the vessel to a pouring position, cream or other fluid in the main body will flow into the measuring compartment or valve cylinder 9 through inlet port 20, which opening is of sufficient size to allow the valve cylinder to become filled almost instantaneously. Now, when the thumb lever is depressed the valve cylinder moves forwardly, the effect of which is, first, to close the ports 20 and 21 so that the measuring chamber is cut off from the main supply. Thereafter, continued forward movement of the cylinder causes its front wall to move forwardly beyond the neck line 23' of the closure body or plug 23 so that a discharge passage is created, the fluid passing therethrough into the spout channel and into a waiting receptacle. When the thumb lever is released the cylinder is caused to return to its original position, whereupon it will again become filled, assuming of course that the vessel is continued to be held in an inclined position. Accordingly, successive measured pourings are accomplished by depressing and releasing the thumb lever while the container is held tilted.

It is to be understood that the foregoing is an exemplifying disclosure and that changes may be made in the construction herein shown and described without departing from the spirit and full intendment of the invention which is defined by the following claims.

I claim:

1. In a liquid dispensing device, a container having a tubular pouring spout, a hollow cylindrical measuring body mounted for reciprocating movement within said pouring spout, an inlet opening in the lower side wall near the rear end of said body and a discharge opening in the forward end wall of said body, means on said pouring spout for closing said discharge opening, comprising an elongated substantially streamlined projection that extends longitudinally of the spout through the discharge opening, said pouring spout being straight throughout its length and having two longitudinally spaced vent apertures in its upper side, one internally and the other externally of the container, said body having a vent opening adapted successively to register with said vent apertures, and means for moving the measuring body to successively bring its inlet opening to a closed position within the pouring spout, and to move its discharge opening out of closed relation with said closure projection, and to move said vent opening from said internal to said external vent aperture.

2. A portable liquid dispensing vessel comprising a container having a main compartment for liquid and a handle on one side thereof for manipulating the vessel, a pouring tube straight throughout its length extending through an upper side wall portion of the vessel in an upward and outward sloping direction, a hollow metering cylinder disposed to slide in said tube, a cylinder actuating lever located adjacent said handle, a link member detachably interconnecting the lever and the cylinder, said metering cylinder having an inlet opening in the lower side adjacent its inner end and a discharge opening in its opposite end wall, a stationary, elongate, stream-line shaped plug on the inner surface of said tube, said plug extending through and providing a closure for the discharge opening, said openings being arranged so that initial forward movement of the cylinder moves said inlet opening to a closed position within the tube, and with continued forward movement said discharge opening is shifted out of closed relation with said plug.

NICK SOFTIS.